(12) United States Patent
Min (10) Patent No.: US 9,002,129 B2
(45) Date of Patent: Apr. 7, 2015

(54) METHOD AND DEVICE FOR REDUCING TEMPORAL NOISE FOR IMAGE

(71) Applicant: Mtekvision Co., Ltd., Seongnam-si, Gyeonggi-do (KR)

(72) Inventor: Chang-Ki Min, Seoul (KR)

(73) Assignee: Mtekvision Co., Ltd., Seongnam-Si (KR)

( * ) Notice: Subject to any disclaimer, the term of this patent is extended or adjusted under 35 U.S.C. 154(b) by 140 days.

(21) Appl. No.: 13/848,568

(22) Filed: Mar. 21, 2013

(65) Prior Publication Data

US 2013/0251282 A1    Sep. 26, 2013

(30) Foreign Application Priority Data

Mar. 26, 2012 (KR) .................... 10-2012-0030416

(51) Int. Cl.
  *G06K 9/40* (2006.01)
  *G06T 5/00* (2006.01)
  *G06T 5/50* (2006.01)

(52) U.S. Cl.
  CPC . *G06T 5/002* (2013.01); *G06T 5/50* (2013.01); *G06T 2207/10016* (2013.01); *G06T 2207/20182* (2013.01)

(58) Field of Classification Search
  USPC .......... 382/260, 261, 275, 236; 348/452, 607, 348/700, 701
  See application file for complete search history.

(56) References Cited

U.S. PATENT DOCUMENTS

| | | | |
|---|---|---|---|
| 6,999,634 B2* | 2/2006 | Hong | 382/275 |
| 7,373,013 B2* | 5/2008 | Anderson | 382/261 |
| 7,724,979 B2* | 5/2010 | Drezner et al. | 382/261 |
| 2008/0118179 A1 | 5/2008 | Jeong et al. | |
| 2010/0027665 A1 | 2/2010 | Pinhasov et al. | |

FOREIGN PATENT DOCUMENTS

| | | |
|---|---|---|
| JP | 2006-229749 A | 8/2006 |
| KR | 10-2008-0048015 A | 8/2008 |
| KR | 10-2011-0037959 A | 4/2011 |

* cited by examiner

*Primary Examiner* — Yon Couso
(74) *Attorney, Agent, or Firm* — Birch, Stewart, Kolasch & Birch, LLP (57) ABSTRACT

A temporal noise reduction method and a temporal noise reduction device are provided. The temporal noise reduction device includes a temporal filter unit that performs a temporal filtering operation using pixel values (CP) of an N×M array in a current frame and pixel values (FP) of an N×M array located at the same position in a neighboring frame separated by a distance $T_P$ from the current frame and a motion filter unit that detects a motion of a pixel image from the resultant values of the temporal filter unit and that eliminates noise of a motion-abundant pixel value using a spatial filter. It is possible to effectively reduce noise of an image to prevent deterioration in image quality of the image and to improve performance of post-processing techniques.

18 Claims, 5 Drawing Sheets

(a) FILTERING OF FIRST FILTER UNIT (b) FILTERING OF SECOND FILTER UNIT
(WITH DELAY OF ROUNDING-UP OF M/2)

METHOD AND DEVICE FOR REDUCING TEMPORAL NOISE FOR IMAGE

CROSS-REFERENCE TO RELATED APPLICATIONS

This application is based on and claims priority under 35 USC 119 from Korean Patent Application No. 10-2012-0030416 filed Mar. 26, 2012, which is hereby incorporated by reference in its entirety.

BACKGROUND

1. Technical Field

The present invention relates to a temporal noise reduction method and a temporal noise reduction device, which reduce noise of an image.

2. Related Art

In general, noise is added in the course of acquiring an image in an image sensor, transmitting the acquired image information, and the like. Accordingly, various noise reduction techniques such as a spatial (2D) noise reduction technique, a temporal noise reduction technique, and a spatial-temporal (3D) noise reduction technique in which the temporal noise reduction technique and the spatial noise reduction technique are combined have been developed to reduce the added noise. The spatial noise reduction technique is a technique of reducing noise using a high correlation between neighboring pixels in an image, and the temporal noise reduction technique is a technique of reducing noise using a high correlation between neighboring frames.

The prior applications for reducing image noise using such noise reduction techniques include Korean Patent Application No. 2006-115422 (image noise reducing method and device) and Korean Patent Application No. 2010-7028204 (video encoder with an integrated temporal filter for reducing noise). The related techniques are also described in "Automatic 2-D and 3-D noise filtering for television receivers", G. de Haan, T. G. Kwaaitaal-Spassova, and O. A. Ojo, Proc. Int. Workshop HDTV '94, October 1994.

The noise added in the course of acquiring and transmitting image information serves as a factor for deteriorating image quality and also serves as a factor for deteriorating performance of image compressing techniques for transmitting data and deteriorating performance of post-processing techniques such as a recognition process.

Accordingly, in order to prevent deterioration in image quality and to improve performance of post-processing techniques, it is necessary to reduce noise.

In the temporal noise reduction techniques according to the related art, noise reduction is performed on the basis of Expression 1.

$$F_T(t) = \lambda \cdot F_S(t) + (1-\lambda) \cdot F_F(t-T_P) \quad \text{Expression 1}$$

In Expression 1, $F_T(t)$ represents a noise-reduced pixel value, $\lambda$ represents a filter control parameter, $F_S(t)$ represents a noise-present pixel value, and $F_F(t-T_P)$ represents a pixel value located at the same position in a previously-filtered frame separated by time $T_P$.

Referring to Expression 1, the performance varies depending on the filter control parameter $\lambda$. In general, as a motion becomes larger, $\lambda$ becomes closer to 1 and the intensity of the filter becomes weaker. As a motion becomes smaller, the correlation in the time direction becomes larger and the intensity of the filter becomes stronger.

Many studies have been carried out to accurately calculate $\lambda$ which is the most important factor in filter performance. A representative method of calculating $\lambda$ is expressed by Expression 2.

$$\lambda = \begin{cases} a_0, & |e| \leq TH_0 \\ a_1, & TH_0 < |e| \leq TH_1 \\ a_2, & |e| > TH_1 \end{cases} \quad \text{Expression 2}$$

$$e = \sum_{y=-M/2}^{M/2} \sum_{x=-N/2}^{N/2} |F_{(x+n,y+m)}(t) - F_{(x+n,y+m)}(t-T_P)|$$

In Expression 2, $a_0$, $a_1$, $a_2$, $TH_0$, and $TH_1$ are user-defined values which are arbitrarily defined by a user, and e means the SAD (Sum of Absolute Difference) of pixel values. Specifically, $F_{(x,y)}(t)$ represents a pixel value of a coordinate (x, y) of a frame of time t, N and M represent values corresponding to N×M which is the size of an array, and $T_P$ represents the distance between frames to be calculated. That is, e represents the absolute difference between an N×M array centered on the position of the pixel value from which noise should be reduced and an array located at the same position in a frame separated by $T_P$.

A method of designating the user-defined values such as $a_0$, $a_1$, $a_2$, $TH_0$, and $TH_1$ and the use thereof will be described below in brief. Since noise randomly appears in an image, a temporal filter is a filter using a technique of reducing noise through the use of a weighted sum of two pixel values on the assumption that when noise is added to a pixel in a current frame, a pixel located at the same position in a neighboring frame has a high probability that noise is not added thereto.

In general, the ranges of $TH_0$ and $TH_1$ are equal to the range of 3. For example, when the range of pixels is from 0 to 255 and the size of an array is 3×3, the range of e is from 0 to 255×9.

When a user designates 120 as $TH_0$, designates 200 as $TH_1$, and designates $a_0$=0.2, $a_1$=0.5, and $a_2$=0.8 and the resultant value of the SAD centered on a pixel X is 100, the calculated SAD is located within the range of e=0 to $TH_0$ and thus $\lambda$ is determined to be 0.2 which is $a_0$ by Expression 2. The noise reduction based on Expression 1 is performed using $\lambda$ calculated in this way.

For example, $a_0$, $a_1$, and $a_2$ are set to satisfy a relationship of $a_0 < a_1 < a_2$. When the SAD value is small, the arrays to be compared have similar values, a motion is determined not to be present, a higher weight value is applied to $F_{(x,y)}(t-T_P)$ at the time of mixing two pixels so as to form a pixel value more similar to $F_{(x,y)}(t-T_P)$. On the contrary, when a motion is large, the SAD has a large value and a lower weight value is applied to $F_{(x,y)}(t-T_P)$ so as not to greatly change the current pixel value.

The temporal filter according to the related art using the above-mentioned method adjusts the intensity of a filter in consideration of a motion of an image, but has a problem in that an afterimage is formed in a motion-present area to deteriorate image quality. Particularly, when the above-mentioned method is applied to a camera not fixed such as a general camera, there is a problem in that an afterimage phenomenon occurs in the whole image and image quality is greatly deteriorated.

In the temporal noise reduction technique according to the related art, filtering is performed on the whole image. Accordingly, when an erroneous value of e is set, there is a problem in that a phenomenon of mixing noise to a normal pixel having no noise occurs.

Therefore, there is a need for a temporal noise reduction technique capable of reducing a motion blurring phenomenon occurring in the temporal filter according to the related art.

SUMMARY

An advantage of some aspects of the invention is to provide a temporal noise reduction method and a temporal noise reduction device which can effectively reduce noise of an image to prevent deterioration in image quality and to improve performance of post-processing techniques.

Another advantage of some aspects of the invention is to provide a temporal noise reduction method and a temporal noise reduction device which can effectively improve image quality of a camera system and which can reduce a motion blurring phenomenon occurring in a temporal filter according to the related art.

Other advantages of the invention will be easily understood from the following description.

According to an aspect of the invention, there is provided a temporal noise reduction device including: a temporal filter unit that performs a temporal filtering operation using pixel values (CP) of an N×M array in a current frame and pixel values (FP) of an N×M array located at the same position in a neighboring frame separated by a distance $T_P$ from the current frame; and a motion filter unit that detects a motion of a pixel image from the resultant values of the temporal filter unit and that eliminates noise of a motion-abundant pixel value using a spatial filter.

The temporal filter unit may include: a spatial filter that eliminates noise of a noise-present pixel in the pixel values (CP) of an N×M array in the current frame with reference to the pixel values of neighboring pixels; and a selective temporal filter that performs the temporal filtering operation only when a first condition is satisfied in which a difference between a first absolute difference ($dif_p$) calculated by an expression abs(FP−SF) and a second absolute difference ($dif_c$) calculated by an expression abs (CP−SF) using the pixel values (CP) of the N×M array in the current frame, the resultant values (SF) of the spatial filter, and the pixel values (FP) of the N×M array located at the same position in the neighboring frame is equal to or less than a zeroth user-defined value ($TH_0$).

When the first condition is satisfied, a filter control parameter ($\lambda$) and a pixel value $F_T(t)$ from which noise is reduced through the temporal filtering operation may be calculated by the following expressions:

$$\lambda = dif_p / (dif_c + dif_p)$$

$$F_T(t) = \lambda \cdot CP + (1-\lambda) \cdot FP.$$

The motion filter unit may include a motion estimating and determining unit that determines that a pixel is a motion-present pixel only when an SAD (sum of absolute difference) of pixel values calculated by the following expression is equal to or more than a first user-defined value ($TH_1$) designated in advance:

$$e = \sum_{y=-M/2}^{M/2} \sum_{x=-N/2}^{N/2} |F_{(x+n, y+m)}(t) - F_{(x+n, y+m)}(t - T_P)|,$$

where $F_{(x+n, y+m)}(t)$ represents a pixel value of a coordinate (x+n,y+m) in a frame of time t, N and M represent natural numbers corresponding to N×M which is the size of an array, and $T_P$ represents the distance between frames to be calculated.

When the motion estimating and determining unit determines that a pixel is a motion-present pixel, the temporal noise reduction device may further include a mixing unit that calculates and outputs a weighted sum of a pixel value (Ori) input to the motion estimating and determining unit and the resultant value ($SF_{cur}$) spatially-filtered by the spatial filter using an expression $(Ori \times TH_2 + SF_{cur} \times (128 TH_2) + 64) >> 7$, where $TH_2$ is a second user-defined value designated in advance.

When the motion estimating and determining unit determines that a pixel is a motion-free pixel, the motion filter unit may include: an average calculating unit that calculates an average of the input value filtered and input by the temporal filter unit and the resultant value obtained by spatially filtering the pixel values of the N×M array located at the same position in the neighboring frame; a selective temporal filter that performs the temporal filtering operation only when a second condition is satisfied in which a difference between a first absolute difference ($dif_p$) calculated by an expression abs (FP−SF') and a second absolute difference ($dif_c$) calculated by an expression abs (CP−SF') using the pixel values (CP) of the N×M array in the current frame, the resultant values (SF') of the average calculating unit, and the pixel values (FP) of the N×M array located at the same position in the neighboring frame is equal to or less than a sixth user-defined value ($TH_6$); and a mixing unit that calculates and outputs a weighted sum of the resultant value (STF_out) filtered by the selective temporal filter and the pixel value ($Input_{cur}$) input from the motion estimating and determining unit using an expression $(STF\_out \times TH_s + Input_{cur} \times (128 - TH_5) + 64) >> 7$, where $TH_5$ is a fifth user-defined value designated in advance.

When the first condition is satisfied, a filter control parameter ($\lambda$) and a pixel value $F_T(t)$ from which noise is reduced through the temporal filtering operation may be calculated by the following expressions:

$$\lambda = dif_p / (dif_c + dif_p)$$

$$F_T(t) = \lambda \cdot CP + (1-\lambda) \cdot FP.$$

The temporal noise reduction device may further include an edge filter unit, and the edge filter unit may include: an edge detecting and determining unit that calculates an edge strength of the input value input from one of the motion filter unit and the temporal filter unit using an edge strength calculating method and that determines whether a pixel is an edge pixel; and a mixing unit that calculates and outputs a weighted sum of the pixel value (Ori') of the current frame and the input value ($F_{cur}$) input from one of the motion filter unit and the temporal filter unit using an expression $Output = (Ori' \times TH_4 + F_{cur} \times (128 - TH_4) + 64) >> 7$, where $TH_4$ is a fourth user-defined value designated in advance.

A preceding filter unit and a subsequent filter unit in a connection structure may perform the sequential filtering process with a delay of the number of lines obtained by rounding up M/2.

According to another aspect of the invention, there is provided a temporal noise reduction method including the steps of (a) causing a temporal filter unit to perform a temporal filtering operation using pixel values (CP) of an N×M army in a current frame and pixel values (FP) of an N×M array located at the same position in a neighboring frame separated by a distance $T_P$ from the current frame and to output the resultant value; and (b) causing a motion filter unit to detect a motion of a pixel image from the resultant values of the temporal filter unit and to eliminate noise of a motion-abundant pixel using a spatial filter.

The step of (a) may include: a step of causing a spatial filter of the temporal filter unit to eliminate noise of a noise-present pixel in the pixel values (CP) of an N×M array in the current frame with reference to the pixel values of neighboring pixels; and a step of causing a selective temporal filter of the temporal filter unit to perform the temporal filtering operation only when a first condition is satisfied in which a difference between a first absolute difference ($dif_p$) calculated by an expression abs (FP−SF) and a second absolute difference ($dif_c$) calculated by an expression abs(CP−SF) using the pixel values (CP) of the N×M array in the current frame, the resultant values (SF) of the spatial filter, and the pixel values (FP) of the N×M array located at the same position in the neighboring frame is equal to or less than a zeroth user-defined value ($TH_0$).

When the first condition is satisfied, a filter control parameter ($\lambda$) and a pixel value $F_T(t)$ from which noise is reduced through the temporal filtering operation may be calculated by the following expressions:

$$\lambda = dif_p/(dif_c + dif_p)$$

$$F_T(t) = \lambda \cdot CP + (1-\lambda) \cdot FP.$$

A motion estimating and determining unit of the motion filter unit may determine that a pixel is a motion-present pixel only when an SAD (sum of absolute difference) of pixel values calculated by the following expression is equal to or more than a first user-defined value ($TH_1$) designated in advance:

$$e = \sum_{y=-M/2}^{M/2} \sum_{x=-N/2}^{N/2} |F_{(x+n,y+m)}(t) - F_{(x+n,y+m)}(t-T_p)|$$

where $F_{(x+n,y+m)}(t)$ represents a pixel value of a coordinate (x+n,y+m) in a frame of time t, N and M represent natural numbers corresponding to N×M which is the size of an army, and $T_P$ represents the distance between frames to be calculated.

The temporal noise reduction method may further include a step of calculating and outputting a weighted sum of a pixel value (Ori) input to the motion estimating and determining unit and the resultant value ($SF_{cur}$) spatially-filtered by the spatial filter using an expression (Ori×$TH_2$+$SF_{cur}$×(128−$TH_2$)+64)>>7 When the motion estimating and determining unit determines that a pixel is a motion-present pixel, where $TH_2$ is a second user-defined value designated in advance.

When the motion estimating and determining unit determines that a pixel is a motion-free pixel, the step of (b) may further include: a step of causing an average calculating unit of the motion filter unit to calculate an average of the input value filtered and input by the temporal filter unit and the resultant value obtained by spatially filtering the pixel values of the N×M array located at the same position in the neighboring frame; a step of causing a selective temporal filter of the motion filter unit to perform the temporal filtering operation only when a second condition is satisfied in which a difference between a first absolute difference ($dif_p$) calculated by an expression abs(FP−SF') and a second absolute difference ($dif_c$) calculated by an expression abs (CP−SF') using the pixel values (CP) of the N×M array in the current frame, the resultant values (SF') of the average calculating unit, and the pixel values (FP) of the N×M array located at the same position in the neighboring frame is equal to or less than a sixth user-defined value ($TH_6$); and a step of causing a mixing unit of the motion filter unit to calculate and output a weighted sum of the resultant value (STF_out) filtered by the selective temporal filter and the pixel value ($Input_{cur}$) input from the motion estimating and determining unit using an expression (STF_out×$TH_5$+$Input_{cur}$×(128−$TH_5$)+64)>>7, where $TH_5$ is a fifth user-defined value designated in advance.

When the first condition is satisfied, a filter control parameter ($\lambda$) and a pixel value $F_T(t)$ from which noise is reduced through the temporal filtering operation may be calculated by the following expressions:

$$\lambda = dif_p/(dif_c + dif_p)$$

$$F_T(t) = \lambda \cdot CP + (1-\lambda) \cdot FP.$$

The temporal noise reduction method may further include: a step of causing an edge detecting and determining unit of the edge filter unit to calculate an edge strength of the input value input from one of the motion filter unit and the temporal filter unit using an edge strength calculating method and to determine whether a pixel is an edge pixel; and a step of causing a mixing unit of the edge filter unit to calculate and output a weighted sum of the pixel value (Ori') of the current frame and the input value ($F_{cur}$) input from one of the motion filter unit and the temporal filter unit using an expression Output=(Ori'×$TH_4$+$F_{cur}$×(128−$TH_4$)+64)>>7 only when it is determined that a pixel is an edge pixel, where $TH_4$ is a fourth user-defined value designated in advance.

A preceding filter unit and a subsequent filter unit in a connection structure may perform the sequential filtering process with a delay of the number of lines obtained by rounding up M/2.

Other aspects, features, and advantages will be apparent from the accompanying drawings, the appended claims, and the following detailed description.

According to the aspects of the invention, it is possible to effectively reduce noise of an image to prevent deterioration in image quality and to improve performance of post-processing techniques.

According to the aspects of the invention, it is possible to effectively improve image quality of a camera system and to reduce a motion blurring phenomenon occurring in a temporal filter according to the related art.

DESCRIPTION OF EXEMPLARY EMBODIMENTS OF THE INVENTION

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "coupled" or "connected" to another element, it should be understood that the element is directly coupled or connected to another element or still another element is interposed therebetween. On the contrary, if it is mentioned that an element is "directly coupled" or "directly connected" to another element, it should be understood that still another element is not interposed therebetween.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Terms, "unit", "-er(-or)", "module", and the like, described in the specification mean a unit for performing at least one function or operation and can be embodied by hardware, by software, or by a combination of hardware and software.

In describing the invention with reference to the accompanying drawings, like elements are referenced by like reference numerals or signs regardless of the drawing numbers and description thereof is not repeated. When it is determined that detailed description of known techniques involved in the invention makes the gist of the invention obscure, the detailed description thereof will not be made.

Figure 1:
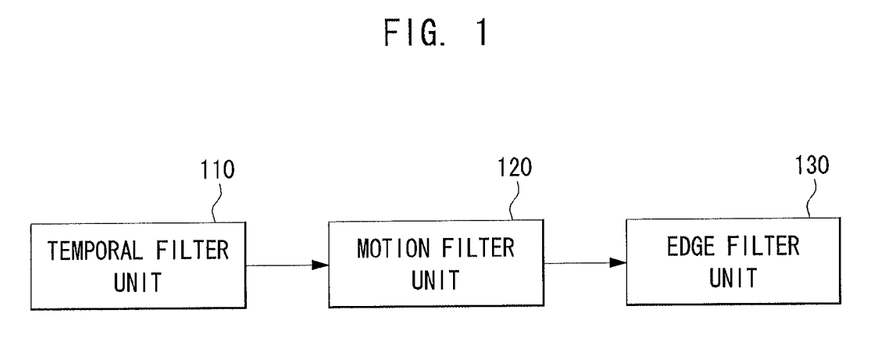
FIG. 1 is a block diagram schematically illustrating a configuration of a temporal noise reduction device according to an embodiment of the invention.
Figure 2:
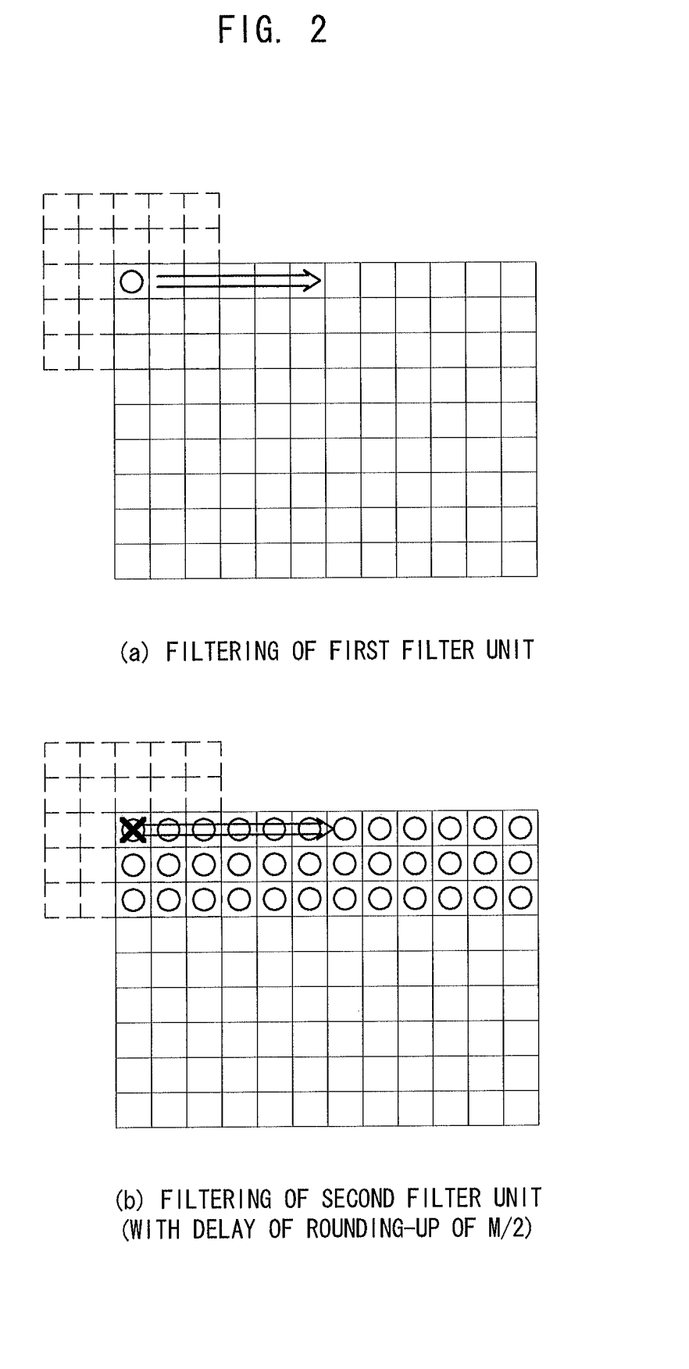
FIG. 2 is a diagram illustrating the concept of a delay in a filtering process according to an embodiment of the invention.

FIG. 1 is a block diagram schematically illustrating a configuration of a temporal noise reduction device according to an embodiment of the invention. FIG. 2 is a diagram illustrating the concept of a delay in a filtering process according to an embodiment of the invention.

Referring to FIG. 1, a temporal noise reduction device includes a temporal filter unit 110, a motion filter unit 120, and an edge filter unit 130.

The temporal filter unit 110 is a filter unit that performs a filtering process using a point of view that there is a high correlation between neighboring frames in an image, and reduces noise by appropriately mixing pixel values of one or more neighboring frames. The temporal filter unit 110 includes a spatial filter 310, a selective temporal filter 320.

Since noise of motion-abundant pixel values is hardly reduced by the filtering process of the temporal filter unit 110, the motion filter unit 120 performs a function of balancing an image by detecting a motion of the pixel image and reducing noise having the motion-abundant pixel values using spatial filters 410 and 420. The motion filter unit 120 performs a filtering process using a selective temporal filter 445 to more effectively reduce noise of a motion-free area.

In general, even when the same scene is continuously photographed, the light intensity incident on an image sensor may be random and an edge component such as a boundary of a character may be blurred in the pixel values filtered by the temporal filter unit 110 and the motion filter unit 120. In order to prevent this blurring, as described later with reference to FIG. 5, an edge detecting unit 510 of the edge filter unit 130 detects an edge and mixes a pixel value filtered by the temporal filter unit 110 and the motion filter unit 120 and a pixel not filtered so as to conserve details of an image.

As described above, input pixel values are sequentially filtered in the unit of N×M arrays by the temporal filter unit 110, the motion filter unit 120, and the edge filter unit 130. Here, N and M are natural numbers. For example, N and M may be the same natural number or may be different natural numbers.

Here, the filtering may be performed with a delay of the number of lines, which is obtained by rounding up M/2, interposed between the elements (that is, between the temporal filter unit 110 and the motion filter unit 120 and between the motion filter unit 120 and the edge filter unit 130).

In general, when an N×M array centered on the position of a pixel from which noise should be reduced is used as a basic unit for reducing noise, N and M are designated as odd numbers. Accordingly, when a 5×5 array is used as shown in FIG. 2, three lines (which are obtained by rounding up 5/2) are delayed.

Therefore, the first filter unit (for example, the temporal filter unit 110) sequentially processes a line from the left to the right of a frame and then processes a next line. When the first filter unit processes three lines, the second filter unit (for example, the motion filter unit 120) starts processing the first pixel at the top-left corner of the image.

By employing this structure, the input array of the second filter unit can include only pixels filtered by the first filter unit. For example, the motion filter unit 120 as the second filter unit calculates the SAD (Sum of Absolute Differences) to detect a motion. When random noise is present in the array, an erroneous calculation result is obtained due to the influence of noise. However, when an array of pixels of which noise is reduced to a certain extent through the filtering of the first filter unit is used as an input, the influence of noise is reduced and it is thus possible to improve motion detection performance.

Similarly, the edge filter unit 130 which is the third filter unit detects an edge. At the time of detecting edge, an edge and noise in an image are both high-frequency components and is not likely to accurately distinguish. Therefore, when an array of pixels from which noise is eliminated to a certain extent is used as an input, the influence of noise is reduced and it is thus possible to improve edge detection performance.

The delay for the final result filtered by the edge filter unit 130 which is the third filter unit may be unnecessary. However, when it is coupled to a spatial filter in the rear stage thereof and is used as a spatial-temporal filter, the delay corresponding to the number of lines obtained by rounding up M/2 may be applied similarly as described above.

As described above, the delay corresponding to the number of lines obtained by rounding up M/2 allows all the pixels of a mask input to the filter units to include the pixels filtered by the preceding filter unit, thereby improving the performance of the noise reduction device.

Figure 3:
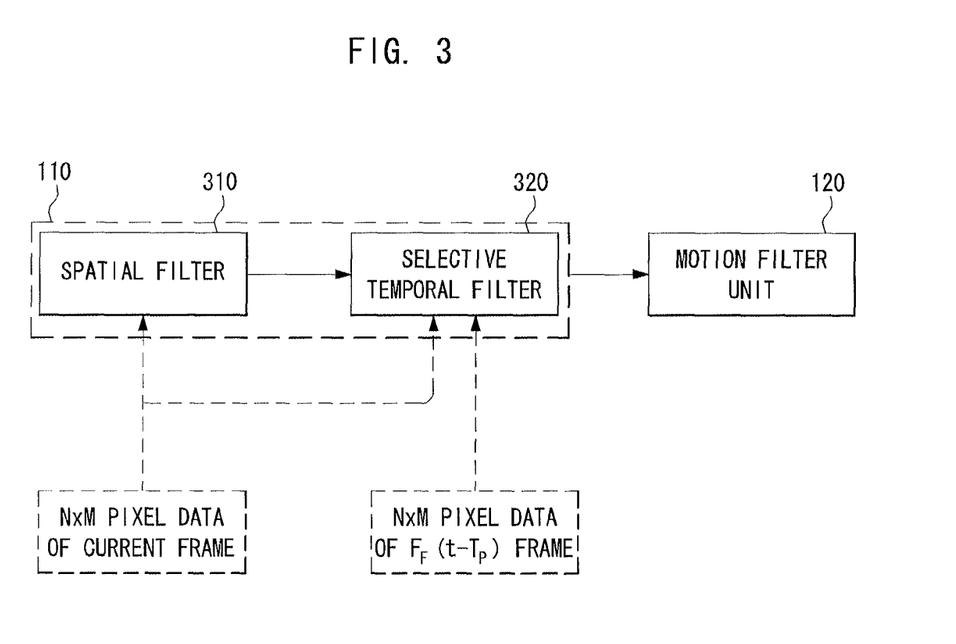
FIG. 3 is a block diagram schematically illustrating a configuration of a temporal filter unit according to an embodiment of the invention.

FIG. 3 is a block diagram schematically illustrating a configuration of a temporal filter unit according to an embodiment of the invention.

Referring to FIG. 3, the temporal filter unit 110 includes a spatial filter 310 and a selective temporal filter 320.

The spatial filter 310 is a filter using a point of view that neighboring pixels in an image have a high correlation, and reduces noise using information of the neighboring pixels. Examples of the spatial filter 310 include a Gaussian filter, an average filter, and a median filter.

For example, when an average filter is used as the spatial filter 310 and the pixel values of a 3×3 array are (120 121 120, 117 183 121, 122 121 119), 183 can be assumed to be a pixel value damaged by noise. In this case, it is possible to eliminate noise by replacing the pixel value with about 127 which is the average of the pixel values of the 3×3 array.

The spatial filter 310 receives the pixel values of an N×M array in a current frame and inputs the filtered resultant values to the selective temporal filter 320.

The selective temporal filter 320 selectively performs a temporal filtering operation depending on the determination result on noise is mixed into an image.

The selective temporal filter 320 uses as input values the resultant values filtered by the spatial filter 310 and the pixel values (co-located pixels) located at the same positions in a frame separated by a distance $t-T_P$ as the pixel values of the N×M array of the current frame. The selective temporal filter 320 performs a filtering operation using Expression 3, similarly to the temporal filter according to the related art. The selective filtering condition and the application method thereof are the same as expressed by Expression 4.

$$dif_c = abs(CP-SF)$$

$$dif_p = abs(FP-SF) \quad \text{Expression 3}$$

Here, CP represents a pixel value (that is, a pixel value from which noise should be eliminated) of the current frame, SF represents the resultant value (that is, a resultant value which is spatially filtered using an N×M array centered on the pixel of which noise should be eliminated and a pixel value from which noise is eliminated) of the spatial filter 310, FP represents the pixel value located at the same position in a frame separated by $t-T_P$, $dif_c$ represents the absolute difference value between the CP and the SF, and $dif_p$ represents the absolute difference between the FP and the SF.

$$if(dif_p - dif_c \leq TH_0)$$

$$\lambda = dif_p/(dif_c + dif_p)$$

$$F_T(t) = \lambda \cdot CP + (1-\lambda) \cdot FP \quad \text{Expression 4}$$

else
Bypass

Here, $TH_0$ is a user-defined value which is arbitrarily defined by a user as described above and $\lambda$ is a filter control parameter.

Since the temporal filter according to the related art performs the temporal filtering process on the whole image, noise may be mixed into a normal pixel or an afterimage phenomenon may be caused.

However, the selective temporal filter 320 according to this embodiment performs a function of assuming a virtual pixel value (that is, SF) which is considered to be free of noise, appropriately mixing two pixel values (that is, CP and FP) to generate a noise-free pixel (that is, a pixel similar to the SF), as presented by Expressions 3 and 4. At this time, the afterimage phenomenon and the erroneous operation can be sufficiently prevented by calculating the value of $\lambda$, but the filtering is selectively performed with a constraint if ($dif_p - dif_c \leq TH_0$) to maintain a noise-free pixel in the original state. That is, Expression 4 means that when the difference of a pixel of a different frame from the virtual pixel is larger, the pixel value of the current frame does not need to be processed and thus the original state is maintained. As a result, it is possible to further maintain details of the original image.

Figure 4:
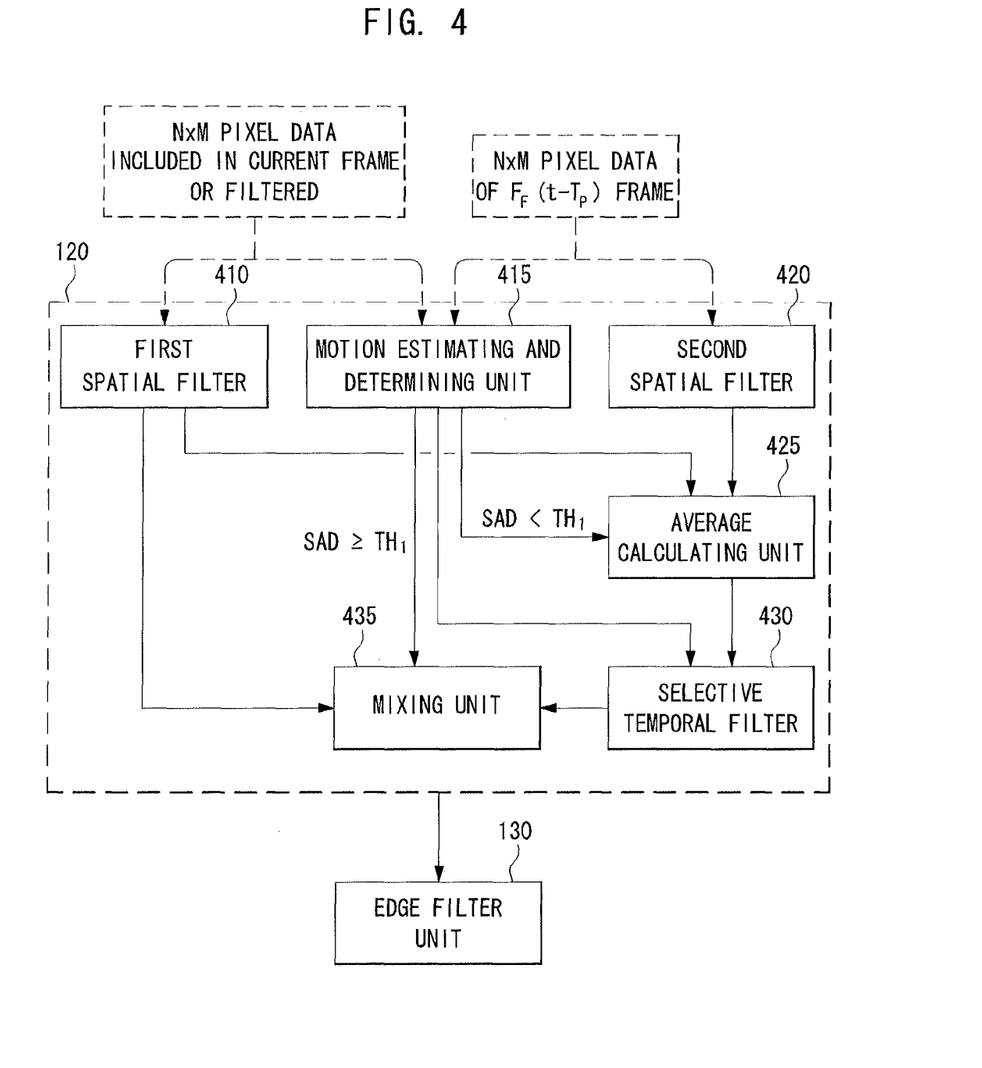
FIG. 4 is a block diagram schematically illustrating a configuration of a motion filter unit according to an embodiment of the invention.

FIG. 4 is a block diagram schematically illustrating the configuration of the motion filter unit according to an embodiment of the invention.

Referring to FIG. 4, the motion filter unit 120 includes a first spatial filter 410, a motion estimating and determining unit 415, a second spatial filter 420, an average calculating unit 425, a selective temporal filter 430, and a mixing unit 435.

Examples of the first spatial filter 410 and the second spatial filter 420 include a Gaussian filter, an average filter, and a median filter, which will not be described again, similarly to the spatial filter 310 described above with reference to FIG. 3.

The motion estimating and determining unit 425 calculates the SAD from the input information using Expression 2 and determines whether a pixel is a motion-present pixel with reference to Expression 5.

$$if(SAD<TH_1) \quad \text{Expression 5}$$

Non Motion Pixel
else
Motion Pixel

Here, $TH_2$ is a user-defined value which is arbitrarily defined by a user. When the calculated SAD is smaller than the user-defined value $TH_1$, it is determined that the pixel is a motion-free pixel.

In this way, the reason that the motion estimating and determining unit 415 distinguishes a motion-present pixel and a motion-free pixel is that when noise remains in a motion-present area in characteristics of the temporal filter and the temporal filter is independently used, the noise can be reduced using the spatial filter.

When the motion estimating and determining unit 415 determines that the pixel has a motion, the resultant value calculated by the mixing unit 435 is output as the filtered resultant value of the motion filter unit 120.

However, when the motion estimating and determining unit 415 determines that the pixel has no motion, the resultant value obtained through the averaging operation of the average calculating unit 425, the filtering operation of the selective temporal filter 430, and the calculation of the mixing unit 435 is output as the filtered resultant value of the motion filter unit 120.

The average calculating unit 425 calculates the average of the input values input from the first spatial filter 410 and the second spatial filter 420. That is, the input values output from the spatial filters may be, for example, the value of a single pixel, and the average calculating unit 425 calculate the average thereof.

The operation and function of the selective temporal filter 430 have been described with reference to FIG. 3 and description thereof will not be repeated. In describing the selective filtering condition of the selective temporal filter and the application method thereof with reference to Expressions 3 and 4, the pixel value (that is, the pixel value from which noise should be eliminated) CP of the current frame, the resultant value SF of the spatial filter, and the pixel value FP located at the same position in a frame separated by $t-T_P$ are required. The selective temporal filter 430 can be supplied with CP and FP from the motion estimating and determining unit 415 or can be supplied through a particular path, and the filtered resultant value SF of the second spatial filter 420 is replaced with the resultant value SP' averaged by the average calculating unit 425, the user-defined value is equal to $TH_0$ in Expression 4 or is replaced with a different value $TH_6$. In this state, Expressions 3 and 4 are applied.

That is, when the motion estimating and determining unit 415 determines that a pixel is a motion-free pixel, it is possible to enhance the effect of noise reduction using the selective temporal filter 430. At this time, the average value of the resultant values obtained by performing the spatial filtering operation on the pixel values of the N×M array included in the current frame or filtered through the above-mentioned filtering process and the pixel values of the N×M array in a frame separated by a distance $t-T_p$ is used as the SF value used to calculate the value of λ, unlike Expression 3 (that is, the selective temporal filter 320 of the temporal filter unit 110).

The mixing unit 435 calculates a weighted sum of two input values depending on the determination result of the motion estimating and determining unit 415. When the motion estimating and determining unit 415 determines that the pixel has a motion, the weighted sum of the input values from the first spatial filter 410 and the motion estimating and determining unit 415 is calculated. When the motion estimating and determining unit 415 determines that the pixel has no motion, the weighted sum of the input values from the first spatial filter 410 and the selective temporal filter 430 is calculated.

Expression 6 or 8 can be used to calculate the weighted sum in the mixing unit 435. Expression 6 is a weighted value calculating formula used when the motion estimating and determining unit 415 determines that the pixel has a motion, and Expression 8 is a weighted sum calculating formula used when the motion estimating and determining unit 415 determines that the pixel has no motion.

$$\text{Output}=(Ori \times TH_2 + SF_{cur} \times (128-TH_2)+64)>>7 \quad \text{Expression 6}$$

Here, Ori represents the pixel value input to the first spatial filter 410 and the motion estimating and determining unit 415, $SF_{cur}$ represents the resultant value filtered by the first spatial filter 410, and $TH_2$ represents a user-defined value which is arbitrarily defined by a user as described above. In Expression 6, >>7 is a bit calculation shift, means division by 128 which is the sum of weighted values, means that +64 is first calculated and then rounding-off is performed. Therefore, Expression 6 may be expressed by Expression 7.

$$\text{Output}=(Ori \times TH_2 + SF_{cur} \times (128-TH_2))/128 \quad \text{Expression 7}$$

$$\text{Output}=(STF\_out \times TH_5 + \text{Input}_{cur} \times (128-TH_5)+64)>>7 \quad \text{Expression 8}$$

Here, STF_out represents the resultant value filtered by the selective temporal filter 430, $\text{Input}_{cur}$ represents the pixel value input to the motion estimating and determining unit 415, and $TH_5$ represents a user-defined value which is arbitrarily defined by a user as described above.

As shown in FIG. 4, even when the motion estimating and determining unit 415 determines that the pixel is a motion-free pixel, the mixing unit 435 performs the mixing operation on plural pixel values. This is because when the resultant value filtered by the selective temporal filter 430 is output to the edge filter unit 330 without performing the mixing process, details of an image may be much damaged.

Figure 5:
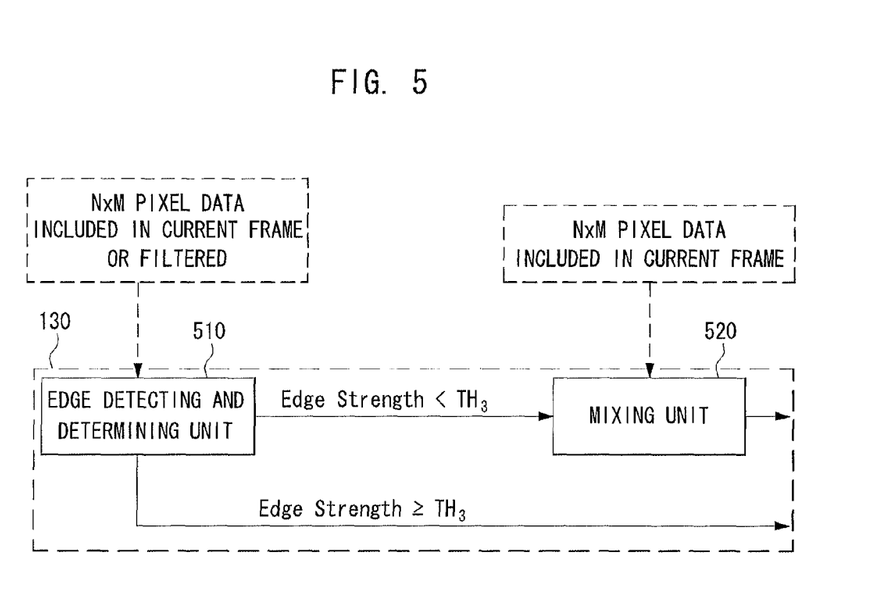
FIG. 5 is a block diagram schematically illustrating a configuration of an edge filter unit according to an embodiment of the invention.

FIG. 5 is a block diagram schematically illustrating the configuration of the edge filter unit according to an embodiment of the invention.

Referring to FIG. 5, the edge filter unit 130 includes an edge detecting and determining unit 510 and a mixing unit 520.

There is a possibility that an edge component of an image is blurred due to characteristics of the image even when the correlation with a neighboring frame is high. In order to prevent this phenomenon, the edge detecting and determining unit 510 calculates edge strength using a sobel mask and determines whether a pixel is an edge pixel depending on whether the calculated edge strength is larger than a predetermined reference value, as presented by Expression 9.

The method of calculating the edge strength using the sobel mask will be described below in brief. For example, it is assumed that the input values of a 3×3 array include (90 100 100, 90 100 100, 90 100 100). First, when an X-axis differential mask having a 3×3 array of (1 2 1, 0 0 0, −1 −2 −1) is applied to the input values, the X value is 0 (that is, 90*1+100*2+100*1+90*0+100*0+100*0+90*−1+100*−2+100*−1). Then, when a Y-axis differential mask having a 3×3 array of (−1 0 1, −2 0 2, −1 0 1) is applied to the input values, the Y value is 40 (that is, 90*−1+100*0+100*1+90*−2+100*0+100*2+90*−1+100*0+100*1). As a result, the edge strength can be calculated to be 40 which is the sum of the X value and the Y value. Accordingly, it can be seen that the corresponding array is an edge component having strength of about 40 in the Y axis direction.

The method of causing the edge detecting and determining unit 510 to calculate the edge strength is not limited to the method using the sobel mask.

$$\text{if(Edge Strengh}<TH_3) \quad \text{Expression 9}$$

Non Edge Pixel else

Edge Pixel

Here, $TH_3$ is a user-defined value which is arbitrarily defined by a user for the purpose of detecting an edge pixel.

The pixel which is determined to be an edge pixel by the edge detecting and determining unit 510 is input to the mixing unit 520 so as to adjust details of the edge.

The mixing unit 520 calculates and outputs a weighted sum of the N×M pixel values of the current frame which are not filtered and the resultant values filtered by the temporal filter unit 110 and the motion filter unit 120. The method of causing the mixing unit 520 to calculate the weighted sum is expressed by Expression 10.

$$\text{Output}=(Ori \times TH_4 + F_{cur} \times (128-TH_4)+64)>>7 \quad \text{Expression 10}$$

Here, Ori represents the N×M pixel values of the current frame not filtered, $F_{cur}$ represents the resultant values filtered by the temporal filter unit 110 and the motion filter unit 120, and $TH_4$ represents a user-defined value which is arbitrarily defined by a user as described above.

As described above, the temporal noise reduction method and the temporal noise reduction device according to the embodiments of the invention can effectively improve image quality of a camera system through the use of the sequential filtering of the temporal filter unit, the motion filter unit, and the edge filter unit, can reduce a motion blurring phenomenon occurring in the temporal filter according to the related art, and can improve performance of image post-processing techniques.

On the other hand, the technical spirit of the invention can be applied to a computer-readable recording medium having recorded thereon a computer program causing a computer to perform the temporal noise reduction method according to this embodiment. The technical spirit based on various embodiments of the invention may be embodied in the form of computer-readable codes on a computer-readable recording medium. Any data storage device which can be read by a computer and which can store data can be employed as the computer-readable recording medium. Examples of the computer-readable recording medium include a ROM, a RAM, a CD-ROM, a magnetic tape, a floppy disk, an optical disk, and a hard disk drive. The computer-readable codes or program recorded on the computer-readable recording medium may be transmitted via a network set up between computers.

While exemplary embodiments of the invention has been shown and described above, the invention is not limited to the embodiments, but it will be understood by those skilled in the art that the invention can be modified in various forms without departing from the spirit and scope of the invention described in the appended claims. These modified forms should not be understood independently of the technical spirit or prospect of the invention.

What is claimed is:

1. A temporal noise reduction device comprising:
a temporal filter unit that performs a temporal filtering operation using pixel values (CP) of an N×M array in a current frame and pixel values (FP) of an N×M array located at the same position in a neighboring frame separated by a distance $T_p$ from the current frame; and
a motion filter unit that detects a motion of a pixel image from the resultant values of the temporal filter unit and that eliminates noise of a motion-abundant pixel using a spatial filter,
wherein the temporal filter unit includes:
a spatial filter that eliminates noise of a noise-present pixel in the pixel values (CP) of an N×M array in the current frame with reference to the pixel values of neighboring pixels; and
a selective temporal filter that performs the temporal filtering operation only when a first condition is satisfied in which a difference between a first absolute difference ($dif_p$) calculated by an expression abs(FP−SF) and a second absolute difference ($dif_c$) calculated by an expression abs(CP−SF) using the pixel values (CP) of the N×M array in the current frame, the resultant values (SF) of the spatial filter, and the pixel values (FP) of the N×M array located at the same position in the neighboring frame is equal to or less than a zeroth user-defined value ($TH_0$).

2. The temporal noise reduction device according to claim 1, wherein when the first condition is satisfied, a filter control parameter ($\lambda$) and a pixel value $F_T(t)$ from which noise is reduced through the temporal filtering operation are calculated by the following expressions:

$$\lambda = dif_p/(dif_c + dif_p)$$

$$F_T(t) = \lambda \cdot CP + (1-\lambda) \cdot FP.$$

3. The temporal noise reduction device according to claim 1, wherein the motion filter unit includes a motion estimating and determining unit that determines that a pixel is a motion-present pixel only when an SAD (sum of absolute difference) of pixel values calculated by the following expression is equal to or more than a first user-defined value ($TH_1$) designated in advance:

$$e = \sum_{y=-M/2}^{M/2} \sum_{x=-N/2}^{N/2} |F_{(x+n,y+m)}(t) - F_{(x+n,y+m)}(t-T_p)|$$

where $F_{(x+n,y+m)}(t)$ represents a pixel value of a coordinate (x+n,y+m) in a frame of time t, N and M represent natural numbers corresponding to N×M which is the size of an array, and $T_p$ represents the distance between frames to be calculated.

4. The temporal noise reduction device according to claim 3, further comprising a mixing unit that calculates and outputs a weighted sum of a pixel value (Ori) input to the motion estimating and determining unit and the resultant value ($SF_{cur}$) spatially-filtered by the spatial filter using an expression (Ori×$TH_2$+$SF_{cur}$×(128−$TH_2$)+64)>>7 when the motion estimating and determining unit determines that a pixel is a motion-present pixel,
wherein $TH_2$ is a second user-defined value designated in advance.

5. The temporal noise reduction device according to claim 3, wherein when the motion estimating and determining unit determines that a pixel is a motion-free pixel, the motion filter unit includes:
an average calculating unit that calculates an average of the input value filtered and input by the temporal filter unit and the resultant value obtained by spatially filtering the pixel values of the N×M array located at the same position in the neighboring frame;
a selective temporal filter that performs the temporal filtering operation only when a second condition is satisfied in which a difference between a first absolute difference ($dif_p$) calculated by an expression abs(FP−SF') and a second absolute difference ($dif_c$) calculated by an expression abs(CP−SF') using the pixel values (CP) of the N×M array in the current frame, the resultant values (SF') of the average calculating unit, and the pixel values (FP) of the N×M array located at the same position in the neighboring frame is equal to or less than a sixth user-defined value ($TH_6$); and
a mixing unit that calculates and outputs a weighted sum of the resultant value (STF_out) filtered by the selective temporal filter and the pixel value ($Input_{cur}$) input from the motion estimating and determining unit using an expression (STF_out×$TH_5$+$Input_{cur}$×(128−$TH_5$)+64)>>7,
wherein $TH_5$ is a fifth user-defined value designated in advance.

6. The temporal noise reduction device according to claim 5, wherein when the first condition is satisfied, a filter control parameter ($\lambda$) and a pixel value $F_T(t)$ from which noise is reduced through the temporal filtering operation are calculated by the following expressions:

$$\lambda = dif_p/(dif_c + dif_p)$$

$$F_T(t) = \lambda \cdot CP + (1-\lambda) \cdot FP.$$

7. The temporal noise reduction device according to claim 1, further comprising an edge filter unit,
wherein the edge filter unit includes:
an edge detecting and determining unit that calculates an edge strength of the input value input from one of the motion filter unit and the temporal filter unit using an edge strength calculating method and that determines whether a pixel is an edge pixel; and
a mixing unit that calculates and outputs a weighted sum of the pixel value (Ori') of the current frame and the input value ($F_{cur}$) input from one of the motion filter unit and the temporal filter unit using an expression Output=(Ori'×$TH_4$+$F_{cur}$×(128×$TH_4$)+64)>>7,
wherein $TH_4$ is a fourth user-defined value designated in advance.

8. The temporal noise reduction device according to claim 1, wherein a preceding filter unit and a subsequent filter unit in a connection structure perform the sequential filtering process with a delay of the number of lines obtained by rounding up M/2.

9. A temporal noise reduction method comprising:
(a) a digital processor causing a temporal filter unit to perform a temporal filtering operation using pixel values (CP) of an N×M array in a current frame and pixel values (FP) of an N×M array located at the same position in a neighboring frame separated by a distance $T_p$ from the current frame and to output the resultant value; and
(b) the digital processor causing a motion filter unit to detect a motion of a pixel image from the resultant values of the temporal filter unit and to eliminate noise of a motion-abundant pixel using a spatial filter, wherein the step of (a) includes:

a step of causing a spatial filter of the temporal filter unit to eliminate noise of a noise-present pixel in the pixel values (CP) of an N×M array in the current frame with reference to the pixel values of neihborin pixels; and a step of causing a selective temporal filter of the temporal filter unit to perform the temporal filtering operation only when a first condition is satisfied in which a difference between a first absolute difference ($\text{dif}_p$) calculated by an expression abs(FP−SF) and a second absolute difference ($\text{dif}_c$) calculated by an expression abs(CP−SF) using the pixel values (CP) of the N×M array in the current frame, the resultant values (SF) of the spatial filter, and the pixel values (FP) of the N×M array located at the same position in the neighboring frame is equal to or less than a zeroth user-defined value ($TH_0$).

10. The temporal noise reduction method according to claim 9, wherein when the first condition is satisfied, a filter control parameter (λ) and a pixel value $F_T(t)$ from which noise is reduced through the temporal filtering operation are calculated by the following expressions:

$$\lambda = \text{dif}_p/(\text{dif}_c + \text{dif}_p)$$

$$F_T(t) = \lambda \cdot CP + (1-\lambda) \cdot FP.$$

11. The temporal noise reduction method according to claim 9, wherein a motion estimating and determining unit of the motion filter unit determines that a pixel is a motion-present pixel only when an SAD (sum of absolute difference) of pixel values calculated by the following expression is equal to or more than a first user-defined value ($TH_1$) designated in advance:

$$e = \sum_{y=-M/2}^{M/2} \sum_{x=-N/2}^{N/2} |F_{(x+n,y+m)}(t) - F_{(x+n,y+m)}(t - T_p)|$$

where $F_{(x+n,y+m)}(t)$ represents a pixel value of a coordinate (x+n,y+m) in a frame of time t, N and M represent natural numbers corresponding to N×M which is the size of an array, and $T_p$ represents the distance between frames to be calculated.

12. The temporal noise reduction method according to claim 11, further comprising a step of calculating and outputting a weighted sum of a pixel value (Ori) input to the motion estimating and determining unit and the resultant value ($SF_{cur}$) spatially-filtered by the spatial filter using an expression (Ori×$TH_2$+$SF_{cur}$×(128−$TH_2$)+64)>>7 when the motion estimating and determining unit determines that a pixel is a motion-present pixel, wherein $TH_2$ is a second user-defined value designated in advance.

13. The temporal noise reduction method according to claim 11, wherein when the motion estimating and determining unit determines that a pixel is a motion-free pixel, the step of (b) further includes:

a step of causing an average calculating unit of the motion filter unit to calculate an average of the input value filtered and input by the temporal filter unit and the resultant value obtained by spatially filtering the pixel values of the N×M array located at the same position in the neighboring frame;

a step of causing a selective temporal filter of the motion filter unit to perform the temporal filtering operation only when a second condition is satisfied in which a difference between a first absolute difference ($\text{dif}_p$) calculated by an expression abs(FP−SF') and a second absolute difference ($\text{dif}_c$) calculated by an expression abs(CP−SF') using the pixel values (CP) of the N×M array in the current frame, the resultant values (SF') of the average calculating unit, and the pixel values (FP) of the N×M array located at the same position in the neighboring frame is equal to or less than a sixth user-defined value ($TH_6$); and a step of causing a mixing unit of the motion filter unit to calculate and output a weighted sum of the resultant value (STF_out) filtered by the selective temporal filter and the pixel value ($\text{Input}_{cur}$) input from the motion estimating and determining unit using an expression (STF_out×$TH_5$+$\text{Input}_{cur}$×(128−$TH_5$)+64)>>7, wherein $TH_5$ is a fifth user-defined value designated in advance.

14. The temporal noise reduction method according to claim 13, wherein when the first condition is satisfied, a filter control parameter (λ) and a pixel value $F_T(t)$ from which noise is reduced through the temporal filtering operation are calculated by the following expressions:

$$\lambda = \text{dif}_p/(\text{dif}_c + \text{dif}_p)$$

$$F_T(t) = \lambda \cdot CP + (1-\lambda) \cdot FP.$$

15. The temporal noise reduction method according to claim 9, further comprising:

a step of causing an edge detecting and determining unit of the edge filter unit to calculate an edge strength of the input value input from one of the motion filter unit and the temporal filter unit using an edge strength calculating method and to determine whether a pixel is an edge pixel; and a step of causing a mixing unit of the edge filter unit to calculate and output a weighted sum of the pixel value (Ori') of the current frame and the input value ($F_{cur}$) input from one of the motion filter unit and the temporal filter unit using an expression Output=(Ori'×$TH_4$+$F_{cur}$×(128×$TH_4$)+64)>>7 only when it is determined that a pixel is an edge pixel, wherein $TH_4$ is a fourth user-defined value designated in advance.

16. The temporal noise reduction method according to claim 9, wherein a preceding filter unit and a subsequent filter unit in a connection structure perform the sequential filtering process with a delay of the number of lines obtained by rounding up M/2.

17. A computer-readable medium on which a program command words capable of being executed by the digital processor to perform the temporal noise reduction method according to claim 10 is recorded and which is able to be read by the digital processor.

18. The temporal noise reduction device according to claim 7, wherein a preceding filter unit and a subsequent filter unit in a connection structure perform the sequential filtering process with a delay of the number of lines obtained by rounding up M/2.

* * * * *